United States Patent [19]

Lynam et al.

[11] Patent Number: 5,076,673
[45] Date of Patent: Dec. 31, 1991

[54] PROLONGED COLORATION ELECTROCHROMIC ASSEMBLY

[75] Inventors: Niall R. Lynam, Holland; Kenneth L. Schierbeek, Zeeland, both of Mich.

[73] Assignee: Donnelly Corporation, Holland, Mich.

[21] Appl. No.: 565,660

[22] Filed: Aug. 10, 1990

[51] Int. Cl.$^5$ .............................................. G02F 1/01
[52] U.S. Cl. ................................... 359/271; 359/275; 359/265
[58] Field of Search .............................. 350/357, 355

[56] References Cited

U.S. PATENT DOCUMENTS

| | | | |
|---|---|---|---|
| 2,632,045 | 4/1953 | Sziklai | 178/5.4 |
| 3,280,701 | 10/1966 | Donnelly et al. | 88/77 |
| 3,453,038 | 7/1969 | Kissa et al. | 358/160 |
| 4,135,790 | 1/1979 | Takahashi et al. | 350/357 |
| 4,294,518 | 10/1981 | O'Connor et al. | 350/357 |
| 4,436,378 | 3/1984 | Kirkman | 350/357 |
| 4,573,768 | 3/1986 | Polak et al. | 350/357 |
| 4,618,218 | 10/1986 | Shaw et al. | 350/355 |
| 4,787,717 | 11/1988 | Heinz geb Belgardt et al. | 350/357 |
| 4,958,917 | 9/1990 | Hashimoto et al. | 350/357 |
| 4,960,323 | 10/1990 | Demiryont | 350/357 |
| 4,983,957 | 1/1991 | Ishikawa et al. | 350/357 |

FOREIGN PATENT DOCUMENTS

| | | |
|---|---|---|
| 240226 | 3/1987 | European Pat. Off. |
| 285724 | 12/1987 | European Pat. Off. |

OTHER PUBLICATIONS

"Electrochromism of Organic Compounds II. Spectral and Electrochemical Examination of a System based on Methylviologen and 5,10-Dihydro-5,10-Dimethylphenazine", Shelepin, et al., Scientific-Research Institute of Organic Intermediates and Dyes, Moscow. Translated from Elektrokhimiya, vol. 13, No. 3, pp. 404-408, Mar., 1977. Original article submitted Apr. 8, 1976.

*Primary Examiner*—Rolf Hille
*Assistant Examiner*—Mahshid Saadat
*Attorney, Agent, or Firm*—Price, Heneveld, Cooper, DeWitt & Litton

[57] ABSTRACT

An electrochromic assembly useful for rearview mirrors, windows, vehicle sunroofs, information displays, office partitions and other structures which allows prolonged coloration substantially indefinitely without voltage or concentration gradient induced color segregation. The assembly includes a pair of optically aligned, electrochromic devices defined by at least one transparent sheet, first and second layers of electrochromic material adjacent opposing surfaces of the sheet, the transmittance of said layers being variable when an electrical field is applied, and electrical conductors for applying such an electrical field. Electrical energy is switched alternately from one device to the other for short periods of time while the remaining device is alternately bleached. The switching can continue cyclically for any desired period. A reflective coating may be included to allow operation as a dimming mirror. Anti-reflection and index of refraction matching coatings may be included to enhance transmission. Electrical energy may also be applied to both devices simultaneously to provide a deeper level of coloration than is possible from either device alone.

51 Claims, 7 Drawing Sheets

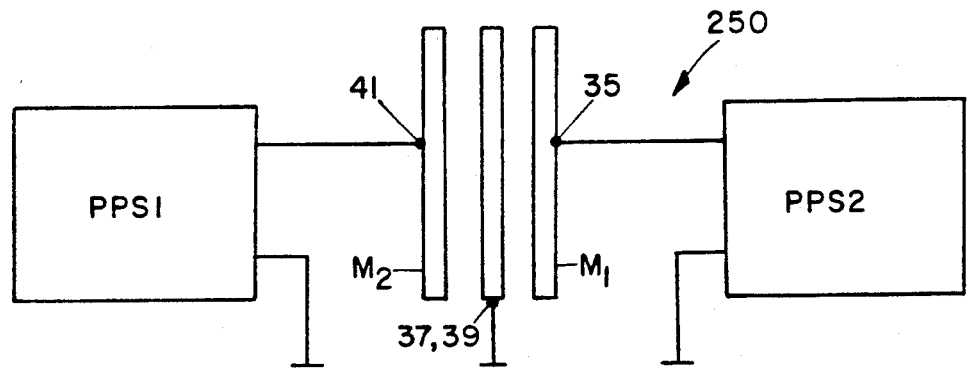
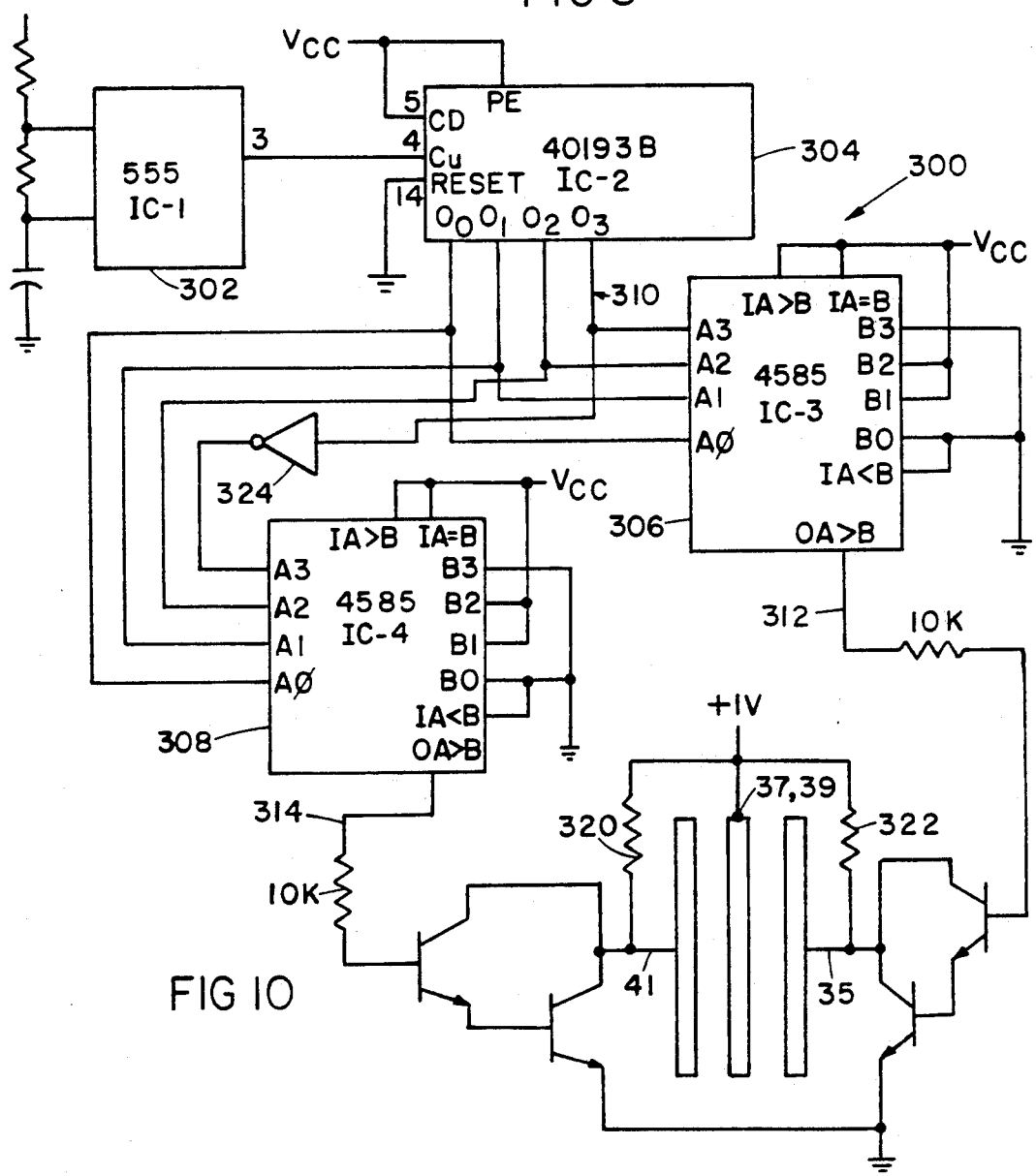

PROLONGED COLORATION ELECTROCHROMIC ASSEMBLY

BACKGROUND OF THE INVENTION

This invention relates to electrochromic devices in which light transmittance varies when an electrical field is applied across an electrochromic material contained therein and, more particularly, to an electrochromic assembly adapted to avoid the disadvantages of coloration segregation when such an assembly is operated over prolonged periods of time.

Electrochromic devices, and especially those including a single-compartment, solution-phase, self-erasing electrochromic/electrochemichromic device, typically include an electrochromic or electrochemichromic material confined between a pair of spaced glass plates. The inside surfaces of the glass plates are coated with transparent, electrically conductive material to which electrical energy is applied creating an electrical field across the electrochromic material. Such field causes the material to color, thereby varying light transmittance through the device. Removal of the electric field or reversal of the electric field causes the device to return to its colorless, transparent state.

A known disadvantage of single-compartment, solution-phase, self-erasing electrochromic devices is exhibited whenever such a device is colored for an extended period of time, sometimes for as short as 60 seconds but more usually over several minutes or hours. When first bleached by removal of the electrical energy after prolonged operation or coloration, bleaching in the device is often nonuniform. Bands of color remain adjacent to the electrically conductive bus bars due to voltage gradient induced segregation, a phenomenon related to the depth of coloration associated with maxima in applied electrical potential with resultant potential gradient assisted diffusion of charged molecules. Bands of coloration may also be seen adjacent regions where there exists a significant concentration difference between colored electrochromic molecules and uncolored electrochromic molecules. This effect is termed concentration induced coloration segregation and is particularly noticeable when, in the above type device, one region is colored for a prolonged period while immediately adjacent regions are left uncolored. Differences in solubilities between the colored and uncolored forms of any of the electrochromic species may also contribute to segregation.

The effects of coloration segregation in electrochromic devices have both cosmetic and functional disadvantages. Bands of colors seen after extended coloration can be aesthetically displeasing in devices such as rearview mirrors, windows, office partitions, information displays and the like where users may question whether the device is damaged or working properly. In information display devices where regions of the device are colored while immediately adjacent regions remain uncolored, the functionality of such devices can be impaired because diffusion of colored molecules into adjacent uncolored regions reduces or eliminates lines of demarkation and thus information definition. While this can occur even during the period of prolonged operation, it is particularly evident upon first bleaching after such a period of extended use. To date, these segregation effects have limited the usefulness and commercial success of many electrochromic devices.

Particular applications of electrochromic devices have also been affected by the above segregation disadvantages. For example, in rearview mirrors, where single-compartment, self-erasing, solution-phase electrochromic devices have usually been offered only in an automatic mode operative upon the sensing of bright lights from the rear of a vehicle, remotely operated, manual rearview mirrors using electrochromic principles could provide prolonged coloration periods for 20 minutes to an hour or more such as would occur during normal night driving. Such extended operation would result in coloration segregation which would be displeasing to the driver until the resultant coloration bands diminished due to recombination of the respective electrochromic molecules. Such segregation is also potentially hazardous in that rear vision is diminished in the regions of the mirror affected by the color bands.

In other devices such as building windows, office partitions, security/privacy windows, and the like, and particularly those where prolonged operation to reduce transmitted light is common, any uneven coloration effects would be plainly visible during daytime/high light level usage creating a cosmetically unappealing effect.

For information display devices, individually addressable regions in such a device are often created by defining pixels by means of etching, laser scribing, sandblasting, masking or otherwise separating portions of an electrically conductive coating on at least one of the glass sheets which confine the electrochromic material. During prolonged operation or coloration of any one pixel, adjacent pixels would be affected through coloration segregation effects due to voltage gradients and especially through concentration gradients such that pixel definition would be impaired and the usefulness of the device diminished.

Various attempts have been made to reduce the effects of coloration segregation in electrochromic devices. For example, thickeners have been added to the electrochromic material as a means of reducing segregation. Also, novel solvents have been used which drastically reduce segregation by reducing leakage currents therein. Yet, there continues to be a need for still further improved electrochromic devices in which the effects of segregation are almost totally eliminated to allow electrochromic devices which can be operated substantially indefinitely without adverse effects on performance, functionality and consumer acceptance.

SUMMARY OF THE INVENTION

Accordingly, the present invention provides electrochromic devices which can be operated indefinitely to reduce the light transmittance therethrough by applying an electrical field to cause coloration without being affected by coloration segregation due to voltage or concentration gradients or the like and which are capable of achieving an exceptionally deep level of coloration at a rapid rate.

In one form, the invention is an electrochromic assembly having first and second optically aligned electrochromic devices defined by a sheet of transparent material, first and second layers of electrochromic material adjacent opposing surfaces of the sheet and electrical means for applying an electric field across each layer of the electrochromic material. The light transmittance of each layer of the electrochromic material varies when the electrical field is applied. Also included are switch means for selectively applying electrical power to the first and second devices to selectively color the devices. The devices may be alternatingly cyclically colored and bleached. Thus, coloration segregation in both of the first and second devices is reduced when the assembly is operated over long periods of time. Also, the devices may be colored concurrently in order to provide a deeper level of coloration than is possible from either device alone.

Preferably, each of the electrochromic devices is a single-compartment, solution-phase, self-erasing electrochromic device. Each device preferably includes two spaced optically transparent elements with the electrochromic material comprising a liquid, thickened liquid, gel or semi-solid confined in the space between the elements. A seal extends around the entire periphery of the assembly and between the first and second elements adjacent their peripheral edges to space the elements apart and confine the electrochromic material within the space. The electrical means include transparent, electrically conductive coatings on the surfaces of the two elements which face one another such that the electrochromic material is in contact with the conductive coatings in the space. Means for connecting an electrical lead to each of the electrically conductive coatings are also provided.

The assembly may be used as an optical shutter for reducing the amount of light entering through a building window, vehicle sunroof, office partition or the like. Alternately, a reflective coating on one of the surfaces of the optical elements may be included to allow the assembly to operate as a dimmable electrochromic mirror.

In other forms of the device, selected areas of the first and second electrochromic devices which are optically aligned and in registry with one another may be operated such that their light transmittance varies separately from the remainder of the devices without coloration segregation over prolonged periods. In this form, the invention is useful as an information display device wherein numerals, letters, symbols or other information within a larger field are displayed.

In yet other forms of the device, the first and second electrochromic devices may be placed in tandem with the intermediate element between the two areas of electrochromic material including a pair of transparent sheets adhered to one another by means of optically transparent adhesive material or by lamination with polymeric sheeting. Alternately, a single intermediate element may be used.

Preferably, the electrical switch includes a circuit which causes coloration of the two devices sequentially, i.e., one following the other while the remaining device is being bleached. Due to differential coloration and bleaching rates however, coloration of the bleached device may be started while the colored device is still partially colored in order to adjust for such different rates. Alternatively, the rate of bleaching may be slowed to more closely match the rate of coloration or vice versa.

Specifically, the electrical switch circuit includes first and second power terminals for producing thereacross a voltage that is capable of changing the electrochromic devices from substantially transparent conditions to colored conditions and means for connecting one of the power terminals to the conductive coatings on the shared wall between the electrochromic devices. A first switch means alternatingly connects the outer conductive coating of one device to the first and second power terminals and a second switch means alternatingly connects the outer conductive coating of the other device to the first and second power terminals. A control means causes the first and second switch means to selectively switch between the first and second power terminals.

While the voltage across the power terminals could be fixed in order to switch the electrochromic devices between predetermined transparency levels, an adjustable voltage may be used in order to provide continuously variable transparency levels. Additionally, the polarity of the voltage across the power terminals could be periodically reversed to further reduce color segregation. A third switch means may be operative upon the loss of power to cause the outer conductive coatings of the electrochromic devices to be shorted to the conductive coatings on the shared wall. When actuated by a voltage sensitive means, this causes the devices to "fail-to-day" rapidly upon the loss of power.

In all embodiments, anti-reflection coatings may be included to provide lower total reflectivity and reduced double imaging. Further, thin films having an index of refraction below that of the optical element may be included to reduce internal light reflection and enhance overall transmission.

The electrochromic assembly of the present invention provides significant advantages over prior known electrochromic devices, especially of the single-compartment, self-erasing, solution-phase type. Most importantly, the assembly may be operated over prolonged periods or even indefinitely while coloration segregation is reduced to negligible amounts or eliminated. The device may be used with both large and small area electrochromic assemblies and may be incorporated in windows, office partitions, security/privacy windows, information displays or, when reflective coatings are included, as dimmable mirrors for rear vision on or in vehicles or other applications. Selected areas in the devices may be electrically operated without coloration segregation occurring in adjacent areas to provide specific information visible in the defined areas as compared to the overall device. In large area electrochromic devices, lag time in coloration of the centralmost areas which normally produces an iris effect is reduced to provide uniform net coloration. Moreover, the assembly is easily adapted for use in various applications such as vehicles or architectural windows and may include various constructions by which electrical connections to the assembly are facilitated.

These and other objects, advantages, purposes and features of the invention will become more apparent from a study of the following description taken in conjunction with the drawings.

BRIEF DESCRIPTION OF THE DRAWINGS

FIG. 8 is a schematic diagram of another form of an electrical switching circuit suitable for operating the electrochromic assemblies of the present invention;

FIG. 10 is a schematic diagram of another form of an electrical switching circuit suitable for operating the electrochromic assemblies of the present invention;

DESCRIPTION OF THE PREFERRED EMBODIMENTS

Figure 1:
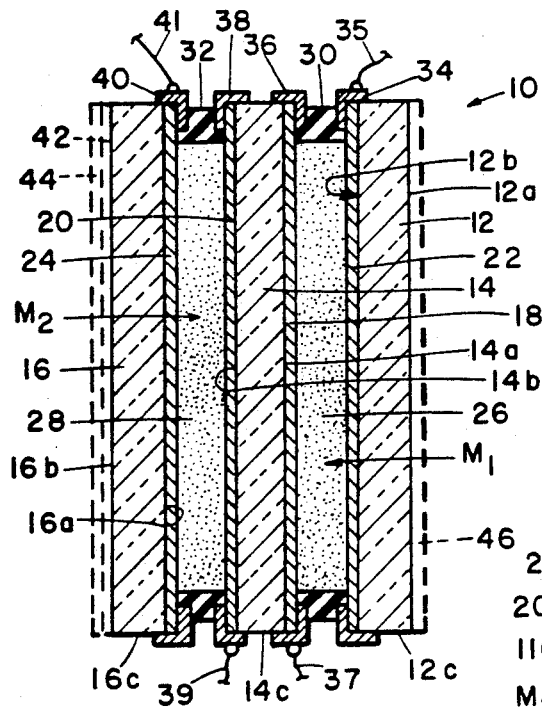
FIG. 1 is a sectional view of a first embodiment of an electrochromic assembly of the present invention.

Referring now to the drawings in greater detail, FIG. 1 illustrates a first embodiment 10 of the electrochromic assembly of the present invention in which a pair of electrochromic devices is optically aligned in a back-to-back, tandem arrangement. At least one of the devices is fully or partially transparent while the other device is operated or colored by application of electrical energy to cause reduced light transmittance therethrough. As discussed more fully below, the invention contemplates inclusion of electrical circuitry to alternately apply electrical energy to the two devices such that one is colored or operated while the other is bleached for successive short periods of time thereby providing overall reduced light transmittance through the device without requiring extended coloration of either of the two devices in the assembly.

Assembly 10 includes three aligned optical elements preferably formed from sheets of transparent material such as soda lime glass, acrylic plastic or the like. Elements 12, 14 and 16 are typically rectangular, square, elliptoidal or circular in shape such as in a vehicular rearview mirror, architectural window or the like although other shapes are possible and the operation of the present invention does not depend on the specific shape of such sheet elements. Each element includes generally parallel front and rear surfaces as well as a peripheral edge surface. Thus, elements 12, 14 and 16 include front surfaces 12a, 14a and 16a, rear surfaces 12b, 14b and 16b and peripheral edges 12c, 14c and 16c. Central element 14 includes transparent electrically conductive coatings 18, 20 on its opposite surfaces 14a, 14b, while elements 12 and 16 include similar transparent electrically conductive coatings 22, 24 on their interior surfaces 12b and 16a which face the central element 14. Preferably, such conductive coatings may be formed from indium tin oxide, doped tin oxide, doped zinc oxide or the like as is conventionally known in the glass coatings industry. Although for reference purposes, surfaces in device 10 are referred to as front and rear surfaces, it will be understood that the assembly may be useful with either element 12 or 16 as the front element or, alternately, the interior or exterior element if the assembly is applied in an architectural window. The front and rear references are used merely for ease of explanation and understanding.

Elements 12 and 16 each are spaced in parallel relationship to central element 14 from surfaces 14a, 14b, respectively, to provide a pair of spaces or cavities 26, 28 which receive a suitable electrochromic/electrochemichromic material. The electrochromic material is confined within cavities 26, 28 by means of appropriate perimeter seals 30, 32, each of which is preferably formed from an epoxy material which adheres well to transparent electrically conductive coatings 18, 20, 22 and 24 on the respective optical element surfaces and is applied adjacent the peripheral edges 12c, 14c, 16c of the elements. A suitable epoxy sealing material is EPON 828 TM from Shell Chemical Company of Houston, Tex., cured by polyamide based curing agent such as V-40 TM from Miller Stephenson Company of Danbury, Conn.

Preferably, each of the glass elements 12, 14 and 16 is as thin as is structurally possible while conductive coatings 18, 20, 22 and 24 have a typical thickness of approximately 1500 angstroms. Beyond the obvious weight reduction advantage inherent in using thin elements 12, 14 and 16, it is desirable from an image quality viewpoint to have the electrochromic coloring regions spaced as closely together as is practical. Thus, the thickness of element 14 should be minimized as much as is practical. In this regard, the construction of FIG. 1 is preferred. A suitable preferred choice for element 14 would be thin (0.016 inch) soda lime glass coated on both of its opposing faces with an indium tin oxide transparent conductive coating of sheet resistance of 15 ohms/square or better.

In order to apply electrical energy to the electrically conductive coatings 18, 20, 22, 24, bus bars 34, 36, 38 and 40 are applied to the conductively coated surfaces of elements 12, 14 and 16 by means of perimeter coatings preferably of metallic, conductive frit material. The bus bars are each coated over the electrically conductive coatings 18, 20, 22 and 24 prior to application of the epoxy sealing materials 30, 32 which space the elements apart, and extend around or encircle the entire conductive coating. Bus bars 34, 36, 38 and 40 are made and applied in accordance with co-pending, commonly assigned U.S. patent application Ser. No. 07/454,398, filed Dec. 21, 1989, invented by Niall R. Lynam and Richard J. Gahan, entitled "PERIMETER COATED, ELECTRO-OPTIC MIRROR," the disclosure of which is hereby incorporated by reference herein. The bus bar coatings of Ser. No. 7/454,398, due to the method of application, typically extend around the corners to the perimeter edges of the elements and partially along those peripheral edges such that the coatings cover the entire corner of the peripheral edge and provide thorough electrical contact with the conductive coatings. Also, as explained in Ser. No. 07/454,398, such coatings may be made reflective when the assembly is used as a rearview mirror or may be otherwise colored to enhance the appearance of edge areas of the assembly. These bus bars preferably extend inwardly toward the center of the conductive coatings 18, 20, 22 and 24 either entirely or partially behind the seal materials 30, 32. Because the bus bars extend around the entire perimeter of the elements 12, 14, 16, electrical energy is applied to the conductive coatings around the entire perimeter.

A suitable conductive paint or frit for bus bars 34, 36, 38 and 40 is du Pont 7713 available from E. I. du Pont de Nemours and Company of Wilmington, Del. Preferably, such material is silk-screened onto the conductive coating and thereafter fired to a temperature greater than 400° C. in a reducing atmosphere to avoid oxidizing the conductive coating. This hardens the conductive paint or frit into a fused layer. Alternately, the conductive bus bar may be formed from ECCOCOAT CC-40A from Emerson and Cumming Inc. of Woburn, Mass.

The peripheral edge portions of the conductive bus bars 34, 36, 38 and 40 provide convenient attachment points for wire leads or electrical connections 35, 37, 39 and 41. Wire leads 35, 37, 39 and 41 are preferably applied by soldering with electrically conductive solder to the exposed portion of the bus bar such that electrical energy is conducted to the entirety of the bus bar and the respective conductive coatings.

After application of the bus bar perimeter coatings 34, 36, 38, 40 to the respective optical elements, seals 30, 32 are silk-screened onto the inner surfaces of the rear and front surfaces 12$b$, 16$a$ of front and rear elements 12, 16, respectively. The corresponding elements are then placed in the tandem, optically aligned arrangement of FIG. 1 with the epoxy still being in tacky condition. The epoxy sealant is then fully cured typically by placing the assembly in an oven at approximately 110° C. for approximately three hours. The sealant material, which is electrically insulating, cross-links, hardens and becomes highly stable and retentive for the electrochromic material through such curing. Epoxy material 30, 32 typically provides a cell gap or space 26, 28 of approximately 50-250 microns in an electrochromic device. Uniformity of spacing of the optical elements is enhanced by inclusion of small, rigid, glass beads mixed into the epoxy sealant prior to application to the surfaces of the elements. Suitable glass beads for inclusion in the epoxy sealant are available under the trademark GS/150 from Nippon Electric Glass of Des Plaines, Ill. Preferably, such glass beads are 150 microns diameter and space the elements to a spacing of approximately 150 microns.

If the assembly is to be used as a rearview mirror, a reflective coating 42 preferably of metallic material such as aluminum, or a combination of silver and copper as is conventionally known, may be applied to the rear surface 16$b$ of element 16 at a preferred thickness within the range of about 500-1000 angstroms. Alternately, if element 16 will be the front element, the coating may be applied to the surface 12$a$ of element 12. Such coating may also be applied as a substitute for conductive coating 24 on inner surface 16$a$ since the reflective coating is also electrically conductive. Other materials which may be used for the reflective layer include chromium, stainless steel, rhodium, platinum, palladium and/or combinations thereof. Such layer provides a highly specular surface which reflects approximately 40-95% of the incident light thereon through the other elements and the electrochromic medium in spaces 26, 28. In order to prevent scattering of glass fragments from element 16 in the event of a breakage or damage during collision in a vehicle, a layer 44 of tape or plastisol-type plastic adhesive typically about 0.1 millimeter thick is applied to the rear surface of reflective coating 42. Such anti-scattering layer may be opaque, translucent or transparent since it is behind the reflective coating 42 and need not transmit or reflect any light.

After formation of the assembly as described above, cavities 26, 28 may be filled by a variety of means such as simple injection of electrochromic materials using a syringe, or by vacuum backfilling as described in co-pending, commonly assigned U.S. patent application Ser. No. 07/443,113, filed Nov. 29, 1989, entitled "HIGH PERFORMANCE ELECTROCHEMICHROMIC SOLUTIONS AND DEVICES THEREOF," invented by Desaraju V. Varaprasad, Niall R. Lynam, Hamid R. Habibi and Padma Desaraju, the disclosure of which is hereby incorporated by reference herein.

As mentioned above, cavities 26, 28 may contain a liquid, thickened liquid, gel or semi-solid electrochromic/electrochemichromic materials $M_1$ and $M_2$ such as the formulations described in U.S. Pat. No. 3,806,229 to Schoot, the disclosure of which is hereby incorporated by reference herein, or as described in co-pending, commonly assigned U.S. patent application Ser. No. 07/443,113 referenced above. The materials $M_1$ and $M_2$ preferably are the same to provide identical performance characteristics.

With any of these electrochromic or electrochemichromic materials, application of an electric field applied through bus bars 34, 36, 38, 40 to conductive coatings 18, 20, 22, 24 will cause these materials in cavities 26, 28 to color to successively darker colors or shades as larger voltages are applied. When voltage is turned off and reduced to zero voltage, or reversed, the coloring is bleached allowing full transmittance of light and, hence, a full reflectivity from layer 42 if such layer is included. In accordance with the present invention, however, an electrical switching circuit is used to successively and alternately color and bleach electrochromic materials $M_1$ and $M_2$ such that neither quantity of electrochromic material is colored for any extended period of time and usually for 60 seconds or less. Consequently, the effects of coloration segregation due to either voltage gradients or concentration gradients or the like are reduced to a negligible value or eliminated entirely.

When appropriate coloring or transmittance variation voltage is applied via bus bars 38, 40 and conductive coatings 20, 24 to the electrochromic material $M_2$ in cavity 28, the electrochromic material $M_2$ colors under the applied voltage. Likewise, when appropriate coloring voltage is applied to bus bars 34, 36 and to conductive coatings 22, 18, electrochromic material $M_1$ in cavity 26 colors. If appropriate coloring voltage is applied simultaneously to all of the bus bars and conductive coatings, electrochromic materials $M_1$ and $M_2$ in both cavities will both color and the light transmission through both electrochromic devices will be at a minimum. If, however, a zero or bleach voltage is applied to both cavities 26, 28 simultaneously, both devices will be in their bleached, highly transmitting state. Thus, transmission through both devices will be at a maximum. When coloring voltage is applied across one cavity while simultaneously a zero or bleach voltage is applied across the other cavity, or vice versa, the transmission through both devices will be reduced to the minimum light transmission of whichever cavity is colored.

In the preferred embodiment, a sequence of coloration of the two electrochromic devices is used such that, when viewed from either element 12 or 16, at least one of the devices is colored. For example, cavity 26 and electrochromic material $M_1$ is initially operated and colored for a time period sufficient to fully or partially reach its deepest coloration but short enough to avoid any significant coloration segregation. A typical period for this would be approximately 30 seconds although device design or construction can determine what time period is preferred. After 30 seconds or so, bus bars 34, 36 are shorted such that electrochromic material $M_1$ begins to bleach while simultaneously electrical voltage is applied to bus bars 38, 40 such that electrochromic material $M_2$ begins to color. By maintaining an appropriate balance between the rates of coloration and bleaching in the respective devices, the net light transmission through electrochromic materials $M_1$ and $M_2$ and assembly 10, when viewed from the side of element 12, will stay low. After approximately 30 seconds, bus bars 38, 40 are shorted and, preferably with polarity reversed, a coloration voltage is applied to bus bars 34, 36 such that electrochromic material $M_1$ colors while electrochromic material $M_2$ is bleached at zero voltage and so on cyclically for as long a period as is desired, even indefinitely. Since electrochromic materials $M_1$ and $M_2$ are never colored individually for more than a short period, and since 30 seconds of bleach is sufficient to substantially recover from the very insignificant segregation possible from coloration for such a short period of time, the tandem construction of assembly 10 can be operated indefinitely to provide reduced light transmission through the assembly for extended periods of time without leading to the normal disadvantages of voltage gradient induced and concentration induced coloration segregation or the like which normally affect long-term electrochromic device operation. Further, alternating reversal of polarity in applying the voltages to the spaced electrochromic media also helps to reduce coloration segregation by eliminating molecular migration toward any one charged conductive surface on a continuous basis. At any time during the sequence, the tandem, optically aligned electrochromic devices can be bleached simultaneously simply by shorting all of the bus bars 34, 36, 38 and 40 thereby returning to full light transmission simply by removing applied electrical energy from the electrochromic materials. This provides a proper fail-to-day mode, for instance, when the device is operated with a reflective layer 42 as a vehicular rearview mirror. "Fail-to-day" means that, should all electrical power be lost in a vehicle using this mirror, the aligned devices would both bleach to their full reflectivity modes allowing safe, full, daytime visibility.

Further, should at any time it be desirable to simultaneously color both of the two electrochromic devices, this can be done by simultaneously applying a full or partial coloring voltage across bus bars 34, 36 and bus bars 38, 40. This would cause transmission through the tandem assembly to dim fully or partially to the minimum achievable by dimming both electrochromic devices. If used as a rearview mirror, this would cause a full or partial minimum in reflectivity. Such a feature would be desirable as the override state ("panic" state) as described in co-pending, commonly assigned U.S. patent application Ser. No. 565,652, filed concurrently herewith, entitled "VEHICULAR MIRROR SYSTEM WITH REMOTELY ACTUATED CONTINUOUSLY VARIABLE REFLECTANCE MIRRORS", invented by Niall R. Lynam and Dale M. Roberts, the disclosure of which is hereby incorporated by reference herein. Thus, a remotely activated rearview mirror, using the tandem construction and operation principles of the present invention, could have in its circuitry an override feature that, when user activated, caused both electrochromic elements to dim simultaneously so that reflectivity reached some lower reflectance state (or some minimum reflectance) during short, timed periods of high glare intensity. Because these short, "panic" states are of infrequent occurrence and are relatively short (less than two minutes or thereabouts), the tandem cycling of this invention, which is the predominant status of the two electrochromic cells, still substantially eliminates the detrimental effects of prolonged coloration.

Figure 5:
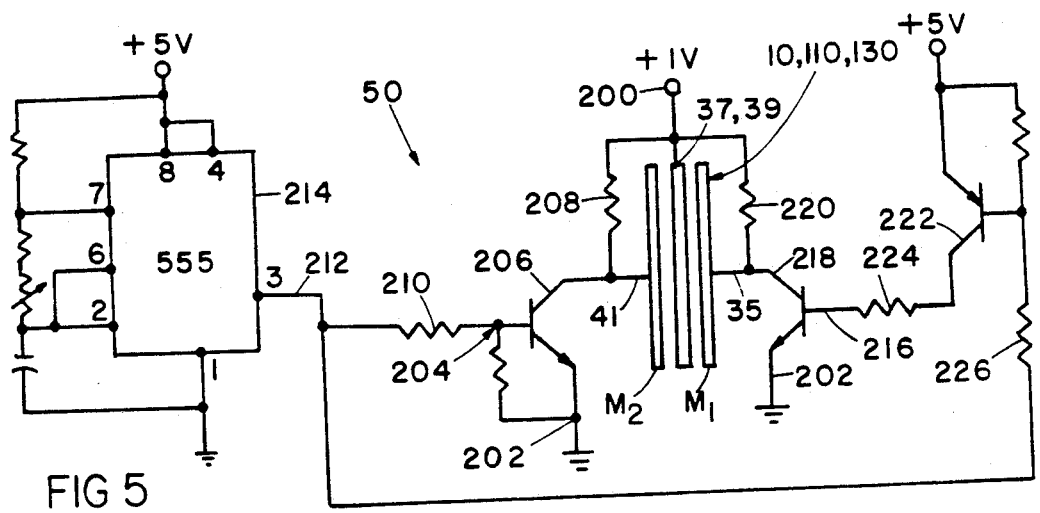
FIG. 5 is a schematic diagram of one form of an electrical switching circuit suitable for operating the electrochromic assemblies of the present invention.

As shown in FIG. 5, a suitable electrical switching circuit 50 appropriate for use with electrochromic assembly 10 is illustrated. Electrical circuit 50 provides application of suitable operating voltage to the electrochromic materials $M_1$ and $M_2$ in assembly 10 in alternating fashion for suitably short periods of time to avoid coloration segregation. Circuit 50 includes a first voltage terminal 200 and a second voltage terminal 202 across which are supplied a voltage of a level sufficient to color electrochromic materials $M_1$ and $M_2$ to the desired level. In the illustrated embodiment, terminal 200 is connected with one volt DC and terminal 202 is connected with signal ground such that circuit 50 can apply one volt DC across materials $M_1$ and $M_2$. Terminal 200 is connected with wire leads 37, 39 extending to conductive coatings 18, 20. Circuit 50 further includes a first switch means 204 connected with lead 41 for alternatingly connecting conductive coating 20 between terminals 200 and 202. Switch means 204 includes a transistor 206 whose emitter is connected with terminal 202 and whose collector is connected with lead 41 and, through a bias resistor 208, with terminal 200. The base of transistor 206 is connected through a bias resistor 210 with an output line 212 of a timing device 214.

Circuit 50 further includes a second switch means 216 connected with lead 35 for alternatingly connecting conductive coating 22 with terminals 200 and 202. Switch means 216 includes a transistor 218 whose emitter is connected with terminal 202 and is connected with lead 35 and, through a resistor 220, with terminal 200. Switch means 216 further includes an inverting transistor 222 whose emitter is connected with a source of voltage, such as five volts DC and whose collector is connected to a resistor 224 with the base of transistor 218. The base of transistor 222 is connected through a resistor 226 with output line 212.

Timing device 214 is a conventional-type 555 integrated circuit, which is configured to alternate the signal on line 212 between high and low states for periods of time between 30 and 40 seconds in each state. In a preferred embodiment, a time interval of 37 seconds is selected. When output 212 is in a low voltage state, transistor 206 is nonconducting and lead 41 is pulled to the level of terminal 200 by resistor 208. Because leads 37, 39 are also at the level of terminal 200, zero volt is applied across electrochromic material $M_2$, which, therefore, bleaches to a transparent state. The low level on line 212 causes transistor 222 to conduct which, in turn, causes transistor 218 to conduct. This pulls lead 35 to the level of terminal 202. Accordingly, one volt DC is applied across material $M_1$ which causes material $M_1$ to color.

When output line 212 is at a positive voltage level, or high state, transistor 206 switches to a conducting state which pulls lead 41 to the level of terminal 202, which applies one volt DC across material $M_2$, causing material $M_2$ to color. The positive voltage and line 212 switches transistors 222 and 218 to nonconducting states which causes lead 35 to be pulled to the level of terminal 200 through resistor 220. This causes zero voltage to be applied across material $M_1$, which bleaches.

Accordingly, as output 212 of timer 214 switches between high and low states, according to the timing interval set for timer 214, materials $M_1$ and $M_2$ are alternatingly supplied with one volt DC and zero volt DC in opposite phase relationship. In a preferred embodiment, the interval of timer 214 was selected to be 37 seconds. This interval is long enough for the alternate device in the assembly to fully bleach but not so long to allow the effect of segregation to be realized in the device being colored. If circuit 50 is applied to an assembly having electrochromic devices that takes longer to bleach than to color, the time interval would be selected to be long enough to allow one device to bleach (or vice versa) without inducing segregation in the coloring device.

Figure 6:
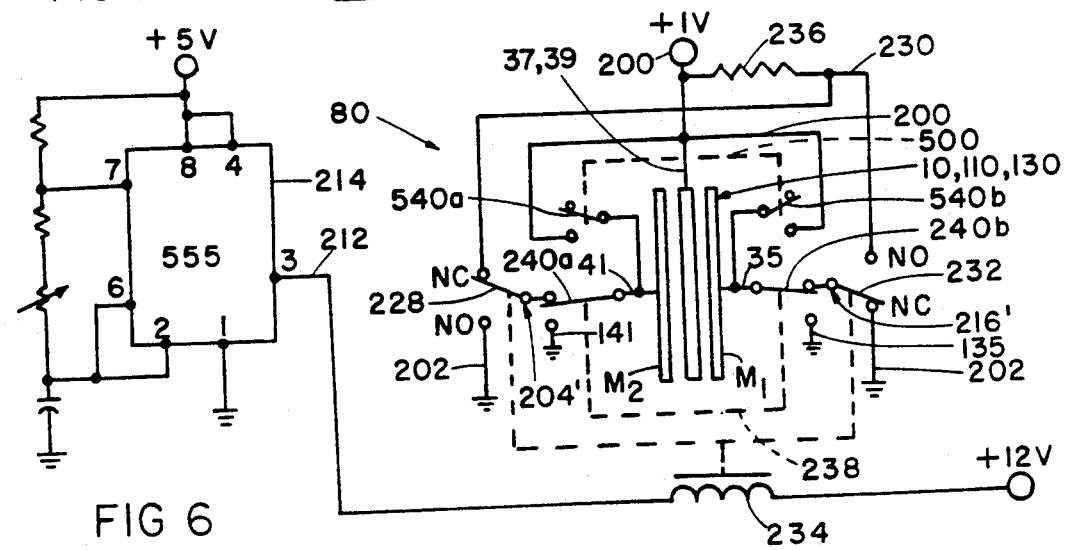
FIG. 6 is a schematic diagram of an alternate electrical circuit suitable for operating the electrochromic assemblies of the present invention.

Alternately, an electrical switching circuit 80 such as that shown in FIG. 6 may be used to apply electrical voltage to the electrochromic materials $M_1$ and $M_2$ in assembly 10. Circuit 80 includes a first switch means 204' in the form of a relay contact 228 which alternates connection of lead 41 between a junction 230 and terminal 202 and a second switch means 216' in the form of a relay contact 232 which alternates connection of lead 35 between junction 230 and terminal 202. Relay contacts 228, 232 are mutually controlled by a common relay solenoid 234. Relay solenoid 234 is connected in series between a source of 12 volts DC and output line 212 such that relay contact 228, 232 alternate positions in reverse phase relationship in response to the change in state of the output of timing device 214. Junction 230 is connected with terminal 200 through a resistor 236.

Circuit 80 further includes a two-pole, triple position switch means 238 which incorporates a first contact 240a and a second contact 240b. This can be a manually operated triple position switch. When switch 238 is selected so that contact 240a is connected directly to first switch means 204' and so that contact 240b is connected to second switch means 216', one device colors while the other device bleaches with the selection being dependent on the respective connection made by relay contacts 228 and 232. When, however, switch 238 is selected so that contacts 240a, 240b are positioned such that leads 35, 41 are connected directly with terminal 200, terminals 35, 37, 39 and 41 are interconnected and both electrochromic materials $M_1$ and $M_2$ are shorted which causes a rapid bleaching of both devices. Finally, when switch 238 is selected so that contacts 240a, 240b are positioned so that leads 41, 35 are connected directly with leads 141, 135, the voltage applied to the circuit through terminal 200 is concurrently applied across both electrochromic devices in the tandem assembly such that electrochromic materials $M_1$ and $M_2$ both color simultaneously and such that the net transmission through the tandem assembly is at a minimum.

Circuit 80 further includes a fail-to-day switch means 500 such that, when power is lost, leads 35, 41 are connected to terminal 200 so that terminals 35, 37, 39 and 41 are directly interconnected. Thus, in the event of power failure, both electrochromic materials $M_1$ and $M_2$ are shorted which causes a rapid bleaching of both devices and a rapid return to the high transmission, "day" state. Switch 500 can be a relay or an equivalent voltage responsive means and is shown, for illustrative purposes, as relay contacts 540a and 540b that, when power is lost, directly connect leads 41, 35 to terminal 200.

Circuit 80 operates substantially the same as circuit 50 except that relay solenoid 234 and contacts 228, 232 perform the functions performed by transistors 206, 218 and 222. The purpose of resistor 236 is to reduce the rate of bleaching of materials $M_1$ and $M_2$, which occurs whenever relay contacts 228, 232 connect their respective leads 41, 35 with junction 230. The resistance of resistor 236 limits the current developed as the corresponding electrochromic material is bleached. The reason that the rate of bleach is slowed is that certain electrochromic material partially bleaches in a shorter period of time than it deeply colors. Thus, the value of resistor 236 is selected to decrease the rate of bleaching to more closely match the rate of coloration. In the illustrated embodiment, resistor 236 is selected to be 67 ohms.

Figure 9:
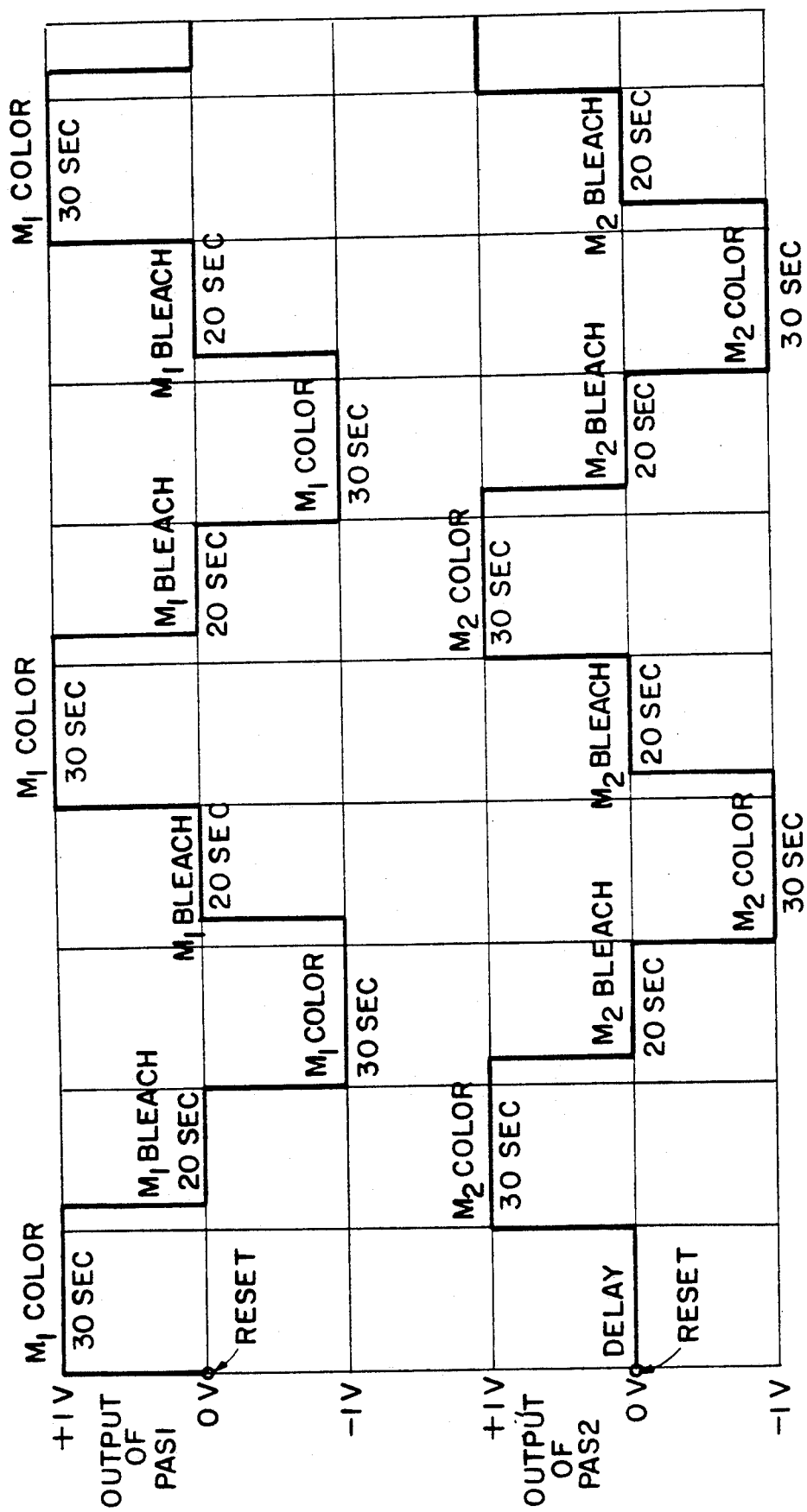
FIG. 9 is a schematic diagram of the time variation of the voltage signals used to power the electrochromic assemblies of the present invention when operated according to the electrical switching circuit of FIG. 8.

Other methods could be employed in order to compensate for the difference between the rate of coloration and the rate of bleaching. As shown in FIG. 8, switching circuit 250 includes a pair of power sources PPS1 and PPS2 which can be configured to begin coloration prior to bleaching of the opposite element. Each power source PPS1 and PPS2 is capable of supplying a voltage to its respective terminal 35, 41 of any value between minus one volt and plus one volt with terminals 37, 39 connected with signal ground, and with power sources PPS1 and PPS2 programmed to provide the voltage wave forms illustrated in FIG. 9, the element that is being colored is supplied with either plus one volt or minus one volt approximately five seconds before the other element is supplied with zero volt to bleach. Thus, the element that is being colored can substantially obtain deep coloration by the time the other element is partially bleached. Additionally, the polarity supplied to each element is reversed between alternating coloration periods. This periodic reversal of polarity further reduces color segregation.

A digital switching circuit 300 is shown in FIG. 10 suitable to use to alternately power the two electrochromic devices in the tandem assembly, with overlap in their color times, thus minimizing the fluctuation in dimmed state reflectivity caused by the one cell not coloring (in percentage terms) as deeply as the other cell partially bleaches. To accomplish the desired result, the devices in the tandem assembly should be driven 180° out of phase and the duty cycle (duration of color portion of the powering cycle compared to the duration of the bleach portion of the same powering cycle) should be greater than 50/50. A clock circuit 302 is the source clock and is set for a frequency that is 16 times greater than the desired frequency of the electrochromic device drive. An integrated circuit 304 is a 4-bit binary counter that continually counts up in a unit binary value on each rising edge of the clock signal generated by clock circuit 302 and which provides inputs on lines 310 for both of comparator integrated circuits 306 and 308. The count value on lines 310 ranges from 0-15 and then restarts at 0 again.

Comparator integrated circuits 306 and 308 compare one 4-bit value (A0 to A3) to another 4-bit value (B0 to B3). Switch circuit 300 uses the A>B output pins 312 and 314 of the comparators to generate signals that serve as inputs to Darlington transistors Q1, Q2 connected respectively between terminals 41, 35 and signal ground. In this embodiment, the B value on input B0 to B3 of comparators 306 and 308 are set to 6, and the A value comes from integrated circuit 304. With the B value set to 6, an A value from 0-6 will produce a low state (zero volt) on the A>B output pin, and values 7-15 produce a high state (Vcc) on the A>B output pin. When A>B output 312 or 314 is high, the respective Darlington transistor Q1, Q2 will turn on and pull its respective terminal 35, 41 to ground. With terminals 37, 39 tied to one volt, the respective element will color. When output 312 or 314 is low, the respective Darlington transistor will be off and the respective terminal 35, 41 will be pulled to the same potential as terminals 37, 39 by resistor 320 or 322 and the respective element will bleach. Since the A>B output pin will be low for count values 0-6 (7 counts), and high for count values 7-15 (9 counts), the percentage on versus off time is approximately 56/44. To make these signals happen 180° out of phase with each other, it is necessary to invert the most significant bit of the A value into comparator 308 using inverter 324.

Figure 11:
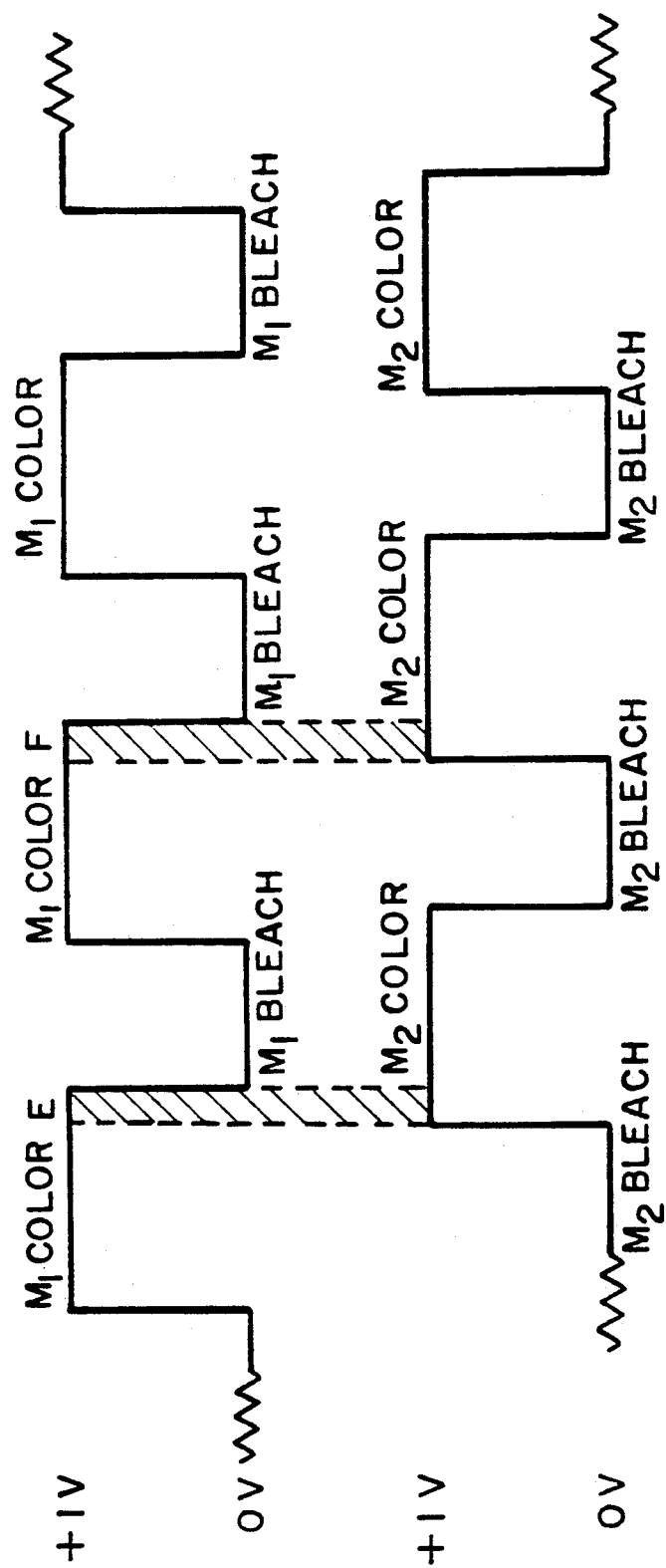
FIG. 11 is a schematic diagram of the time variation of the voltage signals used to power the electrochromic assemblies of the present invention when operated according to the electrical switching circuit of FIG. 10.

The time variation of the voltage signals across leads 35, 41 and ground are shown in FIG. 11. In general, it is desirable when using electrochromatic devices such as are described in the aforementioned U.S. patent application Ser. No. 07/443,113, filed Nov. 29, 1989, to use a color/bleach duty cycle of 3:2. Also, it is preferable that the duration of the coloration portion of the duty cycle be appropriately short but it is also important that the bleach duration by sufficiently long to allow a given device to fully bleach during its bleach portion of the duty cycle. It has been discovered that a 30 second color:20 second bleach (or thereabouts) duty cycle works well. Application of two such signals, 180° mutually out of phase as shown in FIG. 11, insures that adequate overlaps exist to accommodate the differences in coloration and bleaching rates in the respective devices in the tandem assembly. Two examples of overlap are indicated by the dashed region E, F in FIG. 11. A suitable choice for the time duration of the overlap regions is half the difference between the coloration portion and the bleach portion of the duty cycle. For a 30 second color:20 second bleach duty cycle, this is five seconds which, for the particular example shown in overlap region E in FIG. 11, means that electrochromic material $M_2$ in the one device begins to color five seconds before the already colored electrochromic material $M_1$ begins to bleach in the other device. Such overlap insures that the one device incorporating electrochromic material $M_2$ is deeply colored in advance of the other device incorporating electrochromic material $M_1$ commencing bleaching. Thus, there is no transient significant increase in net transmission through the tandem assembly due to the switchover from coloring one device to coloring the other.

Other modifications to the circuit are possible. Instead of applying a fixed voltage across terminals 200, 202, a variable voltage could be applied to provide adjustability to the degree of coloration of the assembly. Such variable voltage could be developed, for example, by a mirror control circuit of the type disclosed in co-pending, commonly assigned U.S. patent application Ser. No. 07/431,284, filed Nov. 3, 1989, invented by Thomas D. Gaffney and Kenneth L. Schierbeek, entitled "DRIVE CIRCUIT FOR AN ELECTROCHROMIC CELL," the disclosure of which is hereby incorporated by reference herein. Also, the polarity of the voltage applied across terminals 200, 202 could be periodically reversed to further help reduce color segregation.

Use of the tandem, optically aligned construction as shown in assembly lo in conjunction with appropriate drive circuitry such as that shown at 50 and 80 in FIGS. 5 and 6 is also particularly useful in large area electrochromic devices. When voltage is applied to such devices via bus bars which circumscribe the perimetal edge regions, coloration in large area devices, such as automotive sunroofs and the like, typically commences at the edges and lags somewhat in the center. This leads to an iris-like effect such that dimming and coloration occurs as a wave from the edges toward the center. Further, because of leakage currents, and particularly in electrochemichromic devices, the central region may not dim as dark as edge regions which are closer to the bus bars and suffer from less voltage reduction than is experienced in more remote central regions. Upon application of zero or reverse bleaching voltage, the opposite is true. Thus, when electrochromic devices are shorted, the edge regions bleach first and the central region remains colored until it, too, finally bleaches. However, by using the tandem construction as shown in assembly 10, and by coloring electrochromic material $M_1$ while simultaneously beaching material $M_2$, the iris effect in cavity 26 during coloration can be matched to the inverse iris effect in cavity 28 during its bleaching phase such that the net coloration, as seen when viewing the tandem construction, appears to be uniform. This sequence is initiated by first applying voltage to color or dim either of electrochemichromic materials $M_1$ or $M_2$ and thereafter, applying appropriate balancing of the coloration and bleaching of the individual cavities 26, 28 to insure a more uniform coloration equivalent to what is seen within the central region of any one cell in the tandem arrangement.

As is also shown in FIG. 1, operation of assembly 10 may be enhanced by inclusion of an anti-reflection means 46 on one or both of surfaces 12a and/or 16b, the outermost surfaces of the assembly. The use of such an anti-reflective coating or coatings provides significant glare and double image reducing advantages for all types of electrochromic assemblies including those using flat, curved or convex or multi-radius glass, for both interior and exterior vehicle applications and other uses. Layer or coating 46 is an optically transparent, thin film such as magnesium fluoride ($MgF_2$) having a refractive index of about 1.38 at 600 nm and deposited at a thickness of about 1075 angstroms onto the surface 12a or 16b of one of the elements. When light is incident in air on the surface of such a coated element at 22.5°, which is typical for standard measurement of reflection from vehicular rearview mirrors under SAEJ964a, the reflectivity of the coated surface is 1.4% of the incident light as viewed by the human eye. Reflectivity for an uncoated surface under the same conditions is approximately 4.2% of the incident light. Multiple layer thin films and other coating constructions may also be used, all as explained in co-pending, commonly assigned U.S. patent application Ser. No. 07/491,447, filed Mar. 9, 1990, invented by Niall R. Lynam, entitled "REDUCED FIRST SURFACE REFLECTIVITY ELECTROCHROMIC/ELECTROCHEMICHROMIC REARVIEW MIRROR ASSEMBLY." the disclosure of which is hereby incorporated by reference herein.

Figure 2:
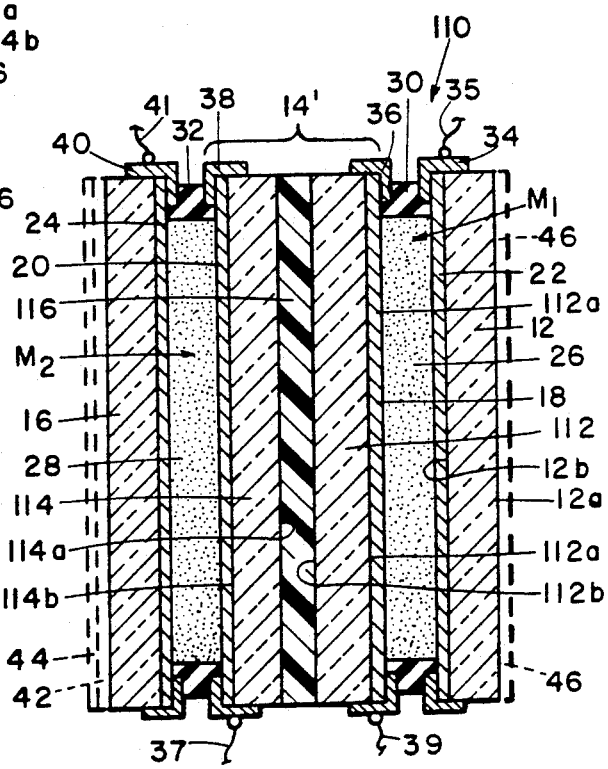
FIG. 2 is a sectional view of a second embodiment of an electrochromic assembly of the present invention.

An alternate form 110 of the electrochromic assembly is shown in FIG. 2 where like numerals indicate like parts to those in assembly 10. Assembly 110 includes a composite center element 14' including a pair of glass panels or sheets 112, 114 adhered and laminated to one another by an optically transparent layer of polymeric material such as a polyvinyl butyral interlayer 116 as is conventionally known in the automotive glass industry. A suitable material is SAFLEX ™ SR#11 from Monsanto Company of St. Louis, Mo. Polymeric layer 116 is applied between surfaces 112b and 114a of elements 112, 114 which are similarly shaped and have generally parallel front and rear surfaces as do elements 12, 14 and 16 as noted above. Preferably, each of the glass elements 112, 114, as well as 12, 16, are as thin as is structurally possible as mentioned above.

Assembly 110 may also include a reflective layer 42, a shatter preventing plastisol or tape layer 44, and/or an anti-reflective coating 46 on one or both exterior surfaces depending on the location of the reflective and anti-shatter layers. Laminate constructions as described in co-pending, commonly assigned U.S. patent application Ser. No. 07/464,888, filed Jan. 16, 1990, entitled "ANTI-SCATTER, ULTRAVIOLET PROTECTED, ANTI-MISTING, ELECTRO-OPTICAL REARVIEW MIRROR," invented by Niall R. Lynam, the disclosure of which is hereby incorporated by reference herein, can be used for either or both of glass elements 12 and 16 and/or for the central element 14' to achieve UV protection, safety and/or tinted effects. As with assembly 10, cavities 26, 28 may be provided between electrically conductive coatings 18 and 22 and 20 and 24 by means of epoxy or other seals 30, 32, while bus bars 34, 36, 38 and 40 are applied in conductive contact with the conductive coatings 18, 20, 22 and 24 to allow application of electrical energy for operation of the assembly substantially in the same manner as assembly 10 to reduce overall coloration segregation effects.

As an alternative to polymer layer 116, an optically transparent adhesive such as NORLAND NOA 65, available from Norland Products, Inc., New Brunswick, N.J., may be used to adhere element 112 to element 114. Such an adhesive is water clear, highly transparent to visible light, includes a moderate modulus of elasticity when cured such that it is not overly brittle, does not fracture upon impact, and includes an index of refraction of 1.52 matched exactly to that of soda lime glass which has a refractive index of 1.52. It also has a relatively low viscosity such that it easily pours and spreads between the two glass panels to allow lamination and bonding once cured. Use of such an optical adhesive or the intermediate polymer layer 116 for laminating elements 112, 114 may be accomplished as described in co-pending, commonly assigned U.S. patent application Ser. No. 07/464,888, filed Jan. 16, 1990, entitled "ANTI-SCATTER, ULTRAVIOLET PROTECTED, ANTI-MISTING, ELECTRO-OPTICAL REARVIEW MIRROR," invented by Niall R. Lynam, the disclosure of which is hereby incorporated by reference herein.

Figure 3:
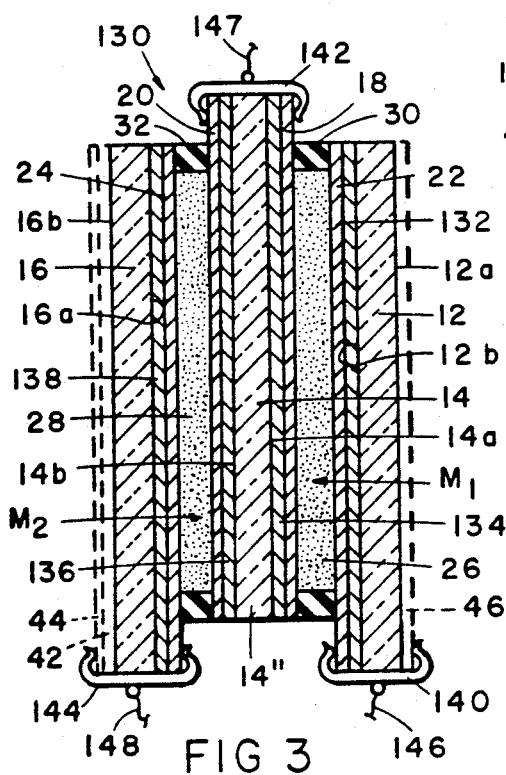
FIG. 3 is a sectional view of a third embodiment of an electrochromic assembly of the present invention.

Yet another form 130 of the electrochromic assembly is shown in FIG. 3 where like numerals indicate like parts to those in assemblies 10 and 110. Assembly 130 differs from the other assemblies by the inclusion of a slight offset of center element 14" from the positions of the front and rear elements 12, 16 to enable ease of attachment of electrical conductors as an alternative to the coated bus bars 34, 36, 38 and 40 described above. In addition, assembly 130 includes refractive index matched thin film means 132, 134, 136 and 138 on the inner surfaces of the elements to reduce interfacial reflections and to enhance overall light transmission.

As shown in FIG. 3, assembly 130 includes glass elements 12, 16 spaced on either side of central element 14" in parallel relationship by seals 30, 32. In addition to transparent, electrically conductive coatings 18, 20, 22 and 24 as in assembly 10, intermediate thin film means 132, 134, 136, 138 are provided intermediate inside surfaces 12b, 14a, 14b and 16a and conductive coatings 22, 18, 20 and 24.

Thin film means 132 is applied to surface 12b of element 12 prior to coating of conductive layer 22 thereover. Likewise, thin film means 134 is applied to surface 14a, thin film means 136 is applied to surface 14b and thin film means 138 is applied to surface 16a prior to application of coatings 18, 20 and 24 respectively over those thin films. The index of refraction of each thin film means 132, 134, 136 and 138, which is preferably formed from magnesium fluoride of thickness of approximately 1400 angstroms, is below the index of refraction of glass elements 12, 14, 16 such that the combined index of refraction of the glass, ITO conductive layer and thin film substantially matches that of the electrochromic material $M_1$, $M_2$ contained in cavities 26, 28. Such index matching reduces interfacial reflections and further enhances overall light transmission through the assembly.

Figure 4:
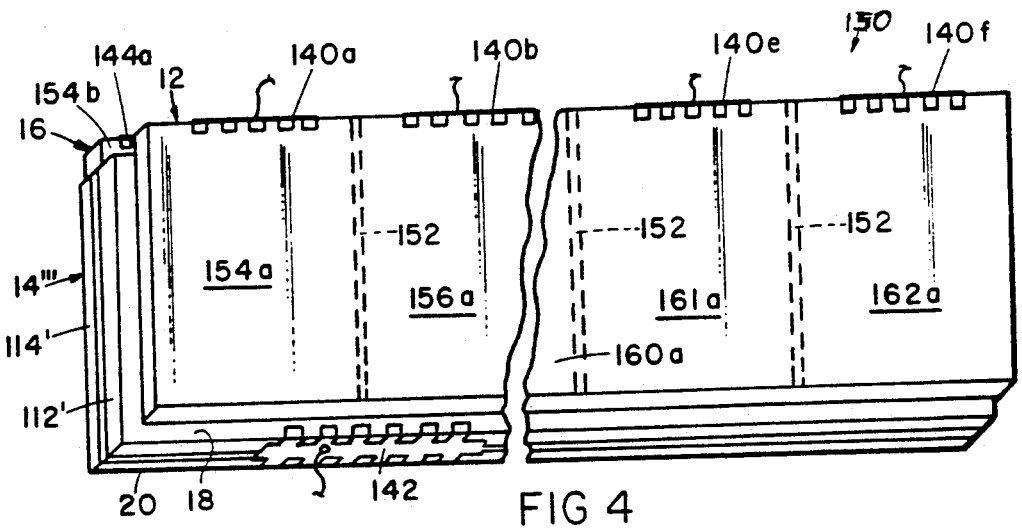
FIG. 4 is a perspective view of a fourth embodiment of an electrochromic assembly of the present invention similar to that shown in FIG. 2 but including separate areas adjacent one another to provide selected light transmittance variation in such adjacent areas.

In addition to thin films 132, 134, 136 and 138, central element 14" is offset slightly with respect to elements 12, 16 such that the opposite edges of elements 12, 14" and 16 of the assembly are exposed. These edges provide suitable areas for application of bent, metallic, electrically conductive ribbon connectors 140, 142 and 144 to elements 12, 14" and 16 respectively. The side edges of the ribbon connectors, which are also shown in FIG. 4 and conventionally known in the automotive mirror art, are bent around and crimped against conductive coating layers 18, 20, 22 and 24 and/or the exterior surfaces of the elements 12, 14", 16 or any coatings applied thereto as shown in FIG. 3. Electrical leads 146, 147, 148 are soldered to the ribbon connectors 140, 142, 144 to provide electrical energy through the connectors to the electrically conductive coatings 18, 20, 22 and 24. As with assemblies 10 and 110, a reflective coating 42 and/or plastisol or tape layer 44, as well as an anti-reflection coating 46, are included on various surfaces of the assembly as described above.

FIG. 4 illustrates another embodiment 150 of the electrochromic assembly of the present invention similar to assembly 110 of FIG. 2 and including outer elements 12, 16 and a laminated central element 14'''. Assembly 150 was built and tested as set forth below. Central element 14''' is offset with respect to the positions of elements 12, 16 in the manner illustrated for assembly 130 in FIG. 3. Elements 12, 16 are 0.063 inch thick soda lime glass panels coated with 1500 angstrom ITO transparent electrically conductive coatings of sheet resistance of about 15 ohms per square. Central element 14''' is formed by laminating two 0.063 inch 15 ohms per square ITO coated glass panels, back-to-back in tandem, using NORLAND 65 optical adhesive. Epoxy seals such as those as 30, 32 described above are used to contain the electrochemichromic material. Elements 12, 112', 114', 16 are spaced from one another by about 150 microns using 150 micron glass beads mixed into the epoxy seal material prior to its application to the assembly. Spaces 26, 28 are filled with an electrochemichromic solution comprising 0.025 M methylviologen perchlorate, 0.025 M 5,10-dihydro-5,10-dimethylphenazine, and 5% weight per volume Uvinul UV stabilizer from BASF Wyandotte, Wyandotte, Mich., dissolved in a solvent consisting of a 50%:50% by volume mixture of 3-hydroxypropionitrile and 3,3'-oxydipropionitrile. The dimensions of each glass panel are six inches by two inches.

Prior to assembly, conductive coating 22 on inside surface 12a of element 12 was segmented into six one inch by two inch pixels or areas by sandblasting insulating or deletion lines 152 roughly 0.5 mm in width across the entire element to divide the coating into six ITO coated regions 154a, 156a, 158a, 160a, 161a, 162a, each region being insulated from the other by the sandblasted deletion line. Likewise, ITO conductive coating 24 on element 16 was similarly partitioned with deletion lines into areas 154b, 156b, 158b, 160b, 161b and 162b such that the tandem assembly included the deletion or insulating lines and separate coated areas on both elements 12, 16 which were aligned and in registry with one another when viewed from the direction of element 12. A common metallic ribbon connector 142 was attached to join ITO coatings 18, 20 together on central element 14''', a portion of ribbon connector 142 being shown in FIG. 4. Twelve individual, shorter ribbon connectors 140a, b, c, d, e and f and 144a, b, c, d, e and f were attached to the extending edges of elements 12, 16 such that, when electricity was applied via connector 142 to conductive coatings 18, 20 on central element 14''', and any one of the twelve ribbon connectors 140, 144 on elements 12, 16, only the particular pixel or area of the six possible in the tandem configuration was colored or dimmed.

Assembly 150 was used by applying a one volt potential to vary the transmission and color of pixel or area 156a, i.e., the second area from the left in FIG. 4. Such one volt potential was applied for a period of one hour. When a bleach voltage (zero volt) was first applied after such prolonged coloration, severe coloration segregation was noted principally due to concentration gradient segregation. Hence, areas 154a and 158a on either side of area 156a were partially colored after such coloration such that it took approximately 30 minutes for recombination reactions within the electrochemichromic fluid to reduce the bands of coloration seen after such operation.

When the following sequence was used in operation of assembly 150, no equivalent coloration segregation effect was noted even after prolonged coloration for 24 hours:

|  | Pixel 156a | Pixel 156b |
|---|---|---|
| Time 0 | Color 1.0 V | Bleach 0 V |
| Time 17 seconds | Bleach 0 V | Color 1.0 V |
| Time 34 seconds | Color 1.0 V | Bleach 0 V |
| Time 51 seconds | Bleach 0 V | Color 1.0 V |
| Time 68 seconds and so on for 24 hours | Color 1.0 V | Bleach 0 V |

As another example, an interior rearview mirror assembly was fabricated using the electrochromic/ electrochemichromic formulation, cell construction and tandem assembly described above, especially as shown in FIG. 3. The sample produced was roughly nine inches long by two inches wide and was in the shape of a conventional, elongated, rectangular interior rearview mirror. The rear surface 16b of the rearmost electrochromic device was coated with a reflective coating 42 as described above such that light entering through the front surface 12a of the forwardmost electrochromic device passed through both devices, was reflected off the reflective surface 42, and passed a second time through both devices before exiting to the viewer's eye. As measured using SAE Standard J964a for automotive mirror reflectivity, the light reflectance of the tandem assembly 130 as constructed above was 70.6% with both devices in their fully bleached, noncolored state. When the assembly was operated using a circuit such as that shown in FIG. 6, with switch 238 set so that one device colored while the other device bleached through the operation of relay contacts 228, 232, the net reflectivity of the rearview mirror remained between a low reflectance state (colored state) of 6.3% which was the lowest reflectance achieved if the forwardmost device between surfaces 12b and 14a was solely colored at one volt, and 7.8% which was the lowest reflectance achieved if the rearmost device between surfaces 14b and 16a was solely colored at one volt.

Figure 7:
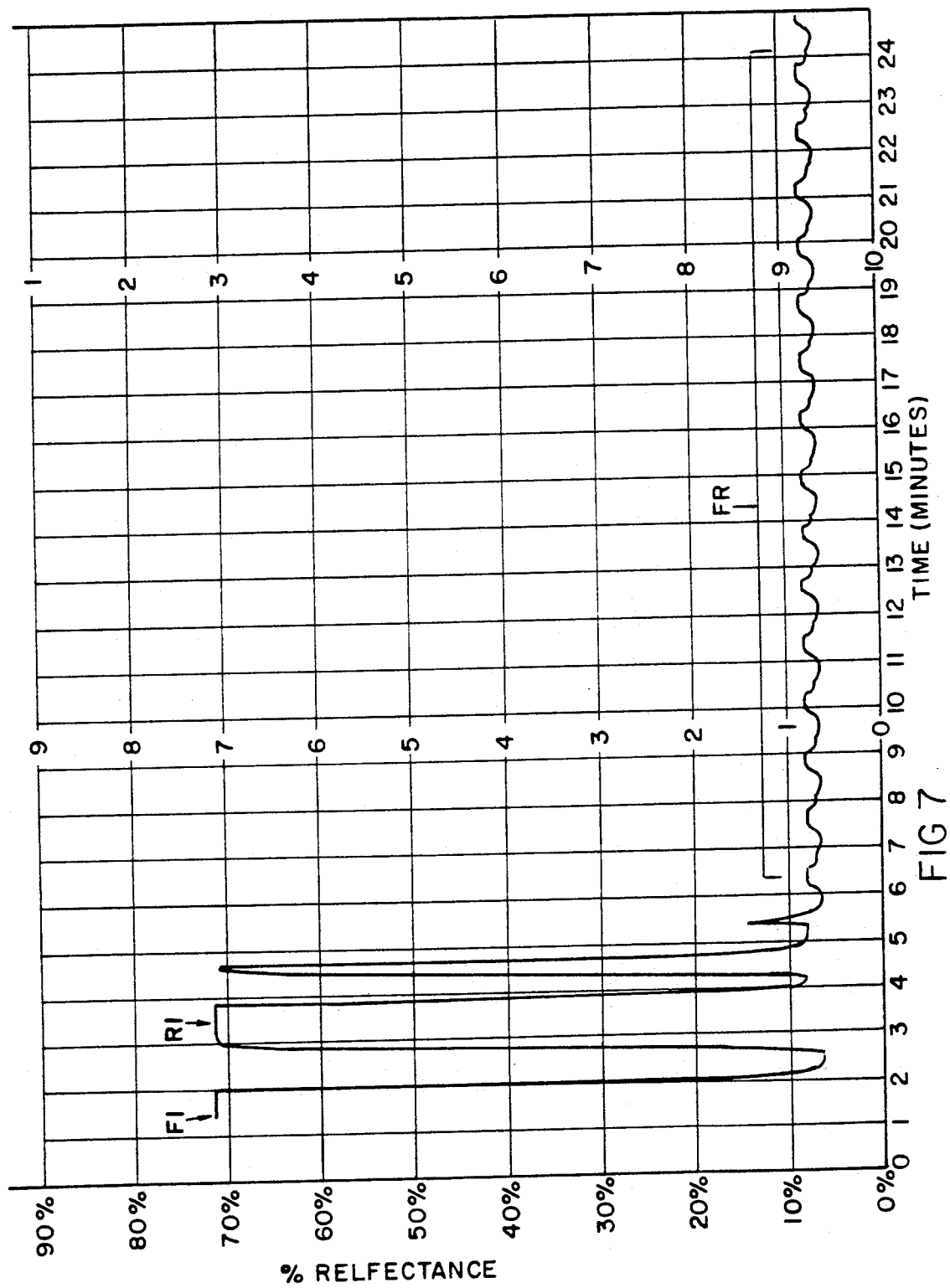
FIG. 7 is a graph of percent reflectance versus time showing the operation of the electrochromic assembly of FIG. 3 including a reflective coating on its rear surface for use as a vehicular rearview mirror.
Figure 12:
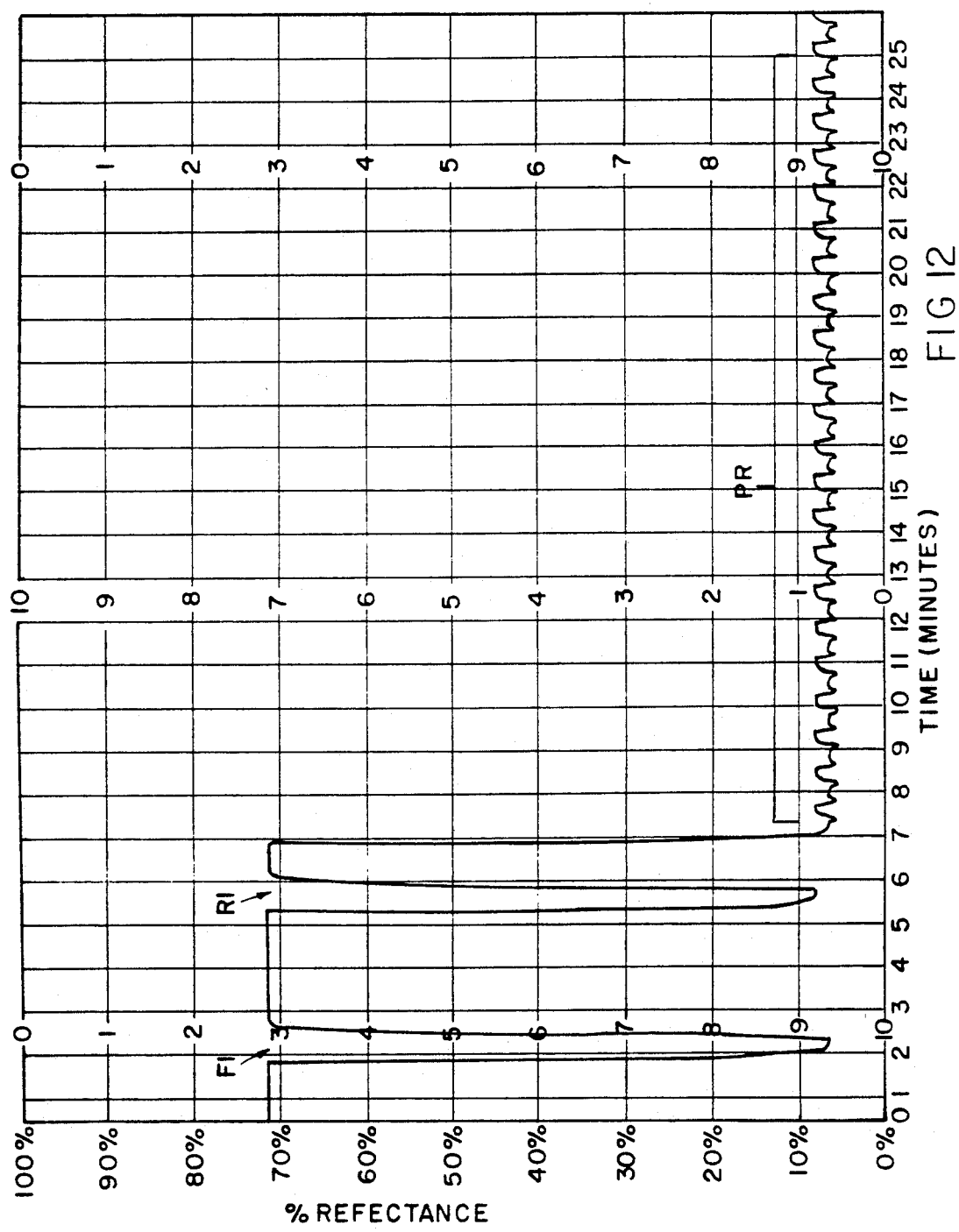
FIG. 12 is another graph of percent reflectance versus time showing the operation of the electrochromic assembly of FIG. 3 including a reflective coating on its rear surface for use as a vehicular rearview mirror.

FIG. 7 is a graph of the operation of this rearview mirror where the vertical axis is reflectance and the horizontal axis is time, the graph being recorded at a chart speed of one centimeter per minute. The first reflectance transient, labeled $F_1$, was due solely to coloration of the forwardmost device between elements 12 and 14. The net reflectivity of the tandem assembly changed from 70.6% down to 6.3%. The second transient, $R_1$, was due to sole coloration of the rearmost device between elements 14 and 16 such that the net reflectivity of the assembly dimmed from 70.6% down to 7.8%. Thereafter, the circuit shown in FIG. 6 was utilized to alternately color one device while the remaining device was bleached and the net reflectivity remained low, as illustrated by the region FR on FIG. 7 with the small oscillations between 7.8% and 6.3% being due to the two devices sequentially achieving their fullest coloration. The small variations between 6.3% and 7.8% were practically imperceptible to the unaided eye of the viewer. Such oscillations can be eliminated should the two devices or cells be identically matched in color/bleach performance. Such matching can be insured by identically matching the respective gaps between elements 12 and 14 and 14 and 16. Further, when a potential of one volt is applied to concurrently color both devices, the net reflectivity of the assembly achieves a minimum reflectance of 4.8%. Also, the circuit shown in FIG. 8, using the powering signals illustrated in FIG. 9, was used to operate this rearview mirror. A graph of this operation is shown in FIG. 12 where the graphing parameters are as previously described. Reflective transients $F_1$ and $R_1$ are as previously described for FIG. 7. With the circuit described in FIG. 8 operating the tandem assembly, the net reflectivity remained low as shown in PR, between about 7.8% R (achieved during those time periods when the frontmost device was fully bleached and the rearmost device was fully colored) and about 5.5% R (achieved when both devices were both deeply colored). No segregation was seen after over 16 hours of continuous coloration of this rearview mirror when operated according to the signals given in FIG. 9.

A rearview mirror configured tandemly and powered such that the one device colored when the other device bleached using a circuit as described above in FIG. 6 was left in its colored, dimmed state for over 60 hours without any perceptible sign of the affects of coloration segregation. At any time during prolonged coloration, the fully bleached state was achievable simply by switching switch 238 so that leads 35, 41, 37, 39 were directly interconnected. The substantially total elimination of such segregation in the present invention, even after an indefinite period of coloration, is a significant improvement and allows use of manually activated, remote control rearview mirrors where, under such manual control, the mirrors can be partially or fully dimmed at the direction and selection of the vehicle driver for periods of up to several hours without coloration segregation occurring.

Such concepts are also equally useful in window assemblies. For example, a window device of roughly 8.75 inches by 2.75 inches was constructed using the concepts described above. In the fully bleached mode, light transmission through the tandem assembly was about 76.5%. When operated by the circuit of FIG. 6, the transmission dimmed to a low value between 10.6% and 13.9%. Even when dimmed for a period exceeding 60 hours, no coloration segregation was seen upon first bleaching after such prolonged operation. Further, when a potential of one volt was applied to concurrently color both devices, the transmission of the tandem assembly achieved a minimum of 1.8%.

While several forms of the invention have been shown and described, other forms will now be apparent to those skilled in the art. For example, an electrochromic device of the single-compartment, solution-phase, self-erasing type could be tandemly combined with a thin film type electrochromic device such as are described in the article "Automotive Applications of Chromogenic Materials" by Niall R. Lynam and Anoop Agrawal as published in the book *Large Area Chromogenics: Materials and Devices for Transmittance Control*, edited by Carl M. Lampert and Claes G. Granqvist, SPIE Optical Engineering Press, Bellingham, Wash., 1990. Indeed, in the specific case of all solid-state devices, one of the tandem electrochromic devices could be a stack of thin films deposited onto the outer surface of a twin substrate laminate cell as described previously. Indeed, in the broadest sense, only one substrate may be needed if all solid-state EC stacks are deposited on opposing faces of the same, single glass substrate.

In several electrochromic assembly designs and particularly in the case of electrochemichromic devices, speed of response, and in particular speed of bleaching, is related to cell thickness. Thus, for fast speed of response, thinner cell thicknesses (30–125 microns) are desirable. However, this beneficial increase in speed of response can be accompanied by a decrease in the depth of coloration. As a consequence, when a rearview mirror is constructed using a single electrochromic device, the reflectivity achieved is often not less than 10%. While this level of glare reduction is satisfactory in many driving conditions, it fails to provide the deep level of coloration required for reflectivity values in the 4–8% range commonly specified by automakers for extreme anti-glare protection.

By using the tandem construction of the invention, thinly spaced EC devices with desirably fast color and bleach rates can achieve the moderate anti-glare protection levels desired in most driving conditions by coloring one device while bleaching the other. The deepest levels of coloration can be achieved by concurrent coloration of both tandem devices. While this is useful in remotel activated vehicular mirror systems having a low reflectance override state, the desired attributes of this aspect of the invention can be realized both in automatic and semi-automatic controls, whereby glare detectors and ambient detectors are used to select whether the electrochromic devices are sequentially or concurrently actuated and, for either mode, the depth of coloration desired.

In office partitions, sunroofs and security/privacy windows, building windows and similar applications, the concurrent operation feature of the invention is capable of providing extra privacy or security, or extra light attenuation performance, through its rapid attainment of deep coloration. During those periods when great depth of coloration, and hence low light transmission, is achieved through concurrent operation, the prolonged application of an electrical field to the EC device may cause segregation. However, such segregation may be preferable in view of the extra privacy, performance or security. For electrochromic devices where means such as the aforementioned thickeners or low leakage-current solvents have been incorporated to minimize the effect of segregation, longer periods of concurrent operation can be attainable.

Also, more than two electrochromic devices as described herein could be assembled in an optically aligned back-to-back arrangement. For example, three devices could be assembled together allowing choice of coloring any two while the third bleaches, coloring only one while the other two bleach or coloring all concurrently. Likewise, if more than three devices are optically aligned in back-to-back assembly, a wide range of choices for cyclical powering of some of these while the remainder bleach, could be made. Further, concurrent coloring of all devices, or a subset thereof, would allow attainment of minima in overall light transmission through the complete assembly.

Therefore, it will be understood that the embodiments shown in the drawings and described above are merely for illustrative purposes, and are not intended to limit the scope of the invention which is defined by the claims which follow.

The embodiments of the invention in which an exclusive property or privelege is claimed are defined as follows:

1. An electrochromic assembly comprising:
   at least first and second optically aligned electrochromic devices defined by a sheet of transparent material, first and second layers of electrochromic material adjacent opposing surfaces of said sheet, the transmittance of each of said layers being variable when an electrical field is applied thereacross, and electrical means for applying an electrical field across each of said layers of electrochromic material; and
   switch means for selectively applying electrical power to said first and second devices, said switch means including means for alternately applying electrical power to said first and second devices in order to cause coloration of one of said devices while bleaching the other of said devices and vice versa.

2. The assembly of claim 1 wherein said electrical power applied to said first and second devices is variable.

3. The assembly of claim 1 wherein said assembly includes a reflective layer on one of said first and second devices and operates as a rearview mirror;
   said switch means including means for applying electrical power concurrently to said first and second devices for short periods of high glare intensity such that the depth of coloration of said assembly for such short periods is greater than that provided by each of said devices, said short periods being insufficient to create coloration segregation in said electrochromic material of said first and second devices, whereby reflectance through said devices and such high glare intensity is reduced during such short periods.

4. The assembly of claim 1 wherein said switch means includes means for periodically reversing the polarity of said electrical power applied to said first and second devices.

5. The assembly of claim 1 wherein at least one of said electrochromic devices comprises first and second spaced, optically transparent elements each having a peripheral edge and front and rear facing surfaces and defining a space therebetween.

6. The assembly of claim 5 wherein said electrochromic material includes at least one of a liquid, thickened liquid, gel and semi-solid electrochromic material confined in said space; and seal means extending around the entire periphery of said assembly and extending between said first and second elements adjacent said peripheral edges for spacing said elements apart and confining said electrochromic material within said space; said electrical means including an electrically conductive coating on the surfaces of said first and second elements which face one another, said electrochromic material being in contact with said conductive coatings in said space, and means for connecting an electrical lead to each of said electrically conductive coatings.

7. The assembly of claim 5 including a reflective coating on one surface of said second element adapted to reflect light incident thereon through said assembly.

8. An electrochromic assembly comprising:
first and second optically aligned electrochromic devices defined by a sheet of transparent material, first and second layers of electrochromic material adjacent opposing surfaces of said sheet, the transmittance of each of said layers being variable when an electrical field is applied thereacross, and electrical means for applying an electrical field across each of said layers of electrochromic material; and
switch means for first applying electrical power to one of said first and second devices for a first short period of time to cause coloration of said one device while bleaching the other of said devices to a colorless, substantially transparent state and secondly applying electrical power to said other device for a second short period of time to cause coloration of said other device while bleaching said one device to a substantially colorless, transparent state, and thereafter alternately applying electrical power and bleaching said devices cyclically in the same manner;
whereby coloration segregation in both of said first and second devices is reduced when said assembly is operated over prolonged periods of time.

9. The assembly of claim 8 wherein at least one of said electrochromic devices comprises first and second spaced, optically transparent elements each having a peripheral edge and front and rear facing surfaces and defining a space therebetween; said electrochromic material including at least one of a liquid, thickened liquid, gel and semi-solid electrochromic material confined in said space; and seal means extending around the entire periphery of said assembly and extending between said first and second elements adjacent said peripheral edges for spacing said elements apart and confining said electrochromic material within said space; said electrical means including an electrically conductive coating on the surfaces of said first and second elements which face one another, said electrochromic material being in contact with said conductive coatings in said space, and means for connecting an electrical lead to each of said electrically conductive coatings.

10. The assembly of claim 9 including a reflective coating on one surface of said second element adapted to reflect light incident thereon through said assembly.

11. The assembly of claim 9 wherein the other of said electrochromic devices includes a third optically transparent element spaced from said first element and having a peripheral edge and front and rear facing surfaces and defining a second space between said first and third elements; said electrochromic material including at least one of a liquid, thickened liquid, gel and semi-solid electrochromic material confined in said second space; seal means extending around the entire periphery of said assembly and extending between said first and third elements adjacent said peripheral edges for spacing said elements apart and confining said electrochromic material within said second space; said electrical means including an electrically conductive coating on the surfaces of said first and third elements which face one another, said electrochromic material in said second space being in contact with said conductive coatings on said first and third elements, and means for connecting an electrical lead to each of said electrically conductive coatings.

12. The assembly of claim 11 including a reflective coating on one of said front and rear facing surfaces of one of said second and third elements, said coating adapted to reflect light incident thereon through said other, nonreflective coated elements and said electrochromic material.

13. The assembly of claim 11 including an anti-reflection coating on the outermost surface of at least one of said second and third elements to provide lower total reflectivity and reduced double imaging.

14. The assembly of claim 11 wherein at least one of the surfaces of said first, second and third elements which face one another includes a thin film, said film having an index of refraction below that of said one element to which it is applied, said combined indices of refraction of said one element and said thin film being generally matched to that of said electrochromic material whereby internal light reflection is reduced and overall light transmission is enhanced.

15. The assembly of claim 11 wherein said electrically conductive coatings of said electrochromic devices include a plurality of areas spaced from one another by uncoated deletion lines, said areas in said respective devices being optically aligned and in registry with one another whereby the transmittance of at least one aligned pair of said spaced areas may be varied separately from the remainder of said areas for prolonged periods of time with reduced coloration segregation.

16. The assembly of claim 8 wherein said electrically conductive coatings of said electrochromic devices include a plurality of areas spaced from one another by uncoated deletion lines, said areas in said respective devices being optically aligned and in registry with one another whereby the transmittance of at least one aligned pair of said spaced areas may be varied separately from the remainder of said areas for prolonged periods of time with reduced coloration segregation.

17. The assembly of claim 9 wherein said second electrochromic device is like said one device; said devices being secured in a tandem, optically aligned relationship with one behind the other by an optically transparent material.

18. The assembly of claim 17 wherein said optically transparent material is an optical adhesive having an index of refraction substantially matched to the index of refraction of said first, second and third elements.

19. The assembly of claim 17 wherein one of said elements of said first device is laminated to one of said elements of said second device with a polymer layer.

20. The assembly of claim 9 wherein said first and second elements are slightly offset from one another such that portions of said transparent, electrically conductive coatings are exposed adjacent said peripheral edges of said elements; said means for connecting an electrical lead including a clamp-type, metallic ribbon connector secured to each offset edge of said optical elements, each of said ribbon connectors contacting at least one of said electrically conductive coatings.

21. The assembly of claim 8 including a reflective coating adapted to reflect light incident thereon through said first element and said electrochromic material.

22. The assembly of claim 8 including an anti-reflection coating on the outermost surface of said transparent sheet to provide lower total reflectivity and reduced double imaging.

23. The assembly of claim 8 wherein said first and second electrochromic devices each include electrical means for selectively applying an electrical field to a selected area of said entire device, said selected areas being optically aligned and in registry with one another whereby the transmittance of said selected areas may be varied separately from the remainder of said devices for prolonged periods of time with reduced coloration segregation.

24. The assembly of claim 8 wherein said switch means includes means for causing each of said devices to begin coloration during the time period in which the remaining device is at least partially colored during said alternating, cyclical operation whereby adjustment is made for matching bleaching rates as compared to coloration rates in said devices.

25. The assembly of claim 8 wherein said switch means include means for causing said one device to color simultaneously with the bleaching of said other device for the same period of time, and vice versa during continued, cyclical operation of said assembly.

26. The assembly of claim 8 wherein said second short period of time immediately follows said first short period of time.

27. The assembly of claim 8 wherein said switch means includes compensation means for adjusting one of said bleaching rate and said coloration rate to substantially match the other one of said rates.

28. An electrochromic assembly comprising:
first, second and third optically transparent elements aligned generally in tandem with one another, each element having a peripheral edge and front and rear surfaces, said third and second elements being spaced respectively from said front and rear surfaces of said first element;
at least one of a liquid, thickened liquid, gel and semisolid electrochromic material confined in said spaces adjacent both surfaces of said first element, said electrochromic material having a light transmittance which varies when an electric field is applied thereacross;
seal means extending around the periphery of said assembly spacing said elements apart and confining said electrochromic material within said spaces;
electrical means for selectively applying electrical power for short periods of time across said electrochromic material in one of said spaces to reduce the light transmittance therethrough and for selectively bleaching at other times said electrochromic material in said one of said spaces, and for selectively applying electrical power for short periods of time across said electrochromic material in said other space and for selectively bleaching at other times said electrochromic material in said other space, said electrical means including means for causing the electrochromic material in said other space to bleach during application of electrical power to the electrochromic material in said one space, and vice versa during continued, cyclical operation of said assembly, whereby coloration segregation in said electrochromic material in both said spaces is reduced when said assembly is operated over prolonged periods of time and the depth of coloration of said assembly may be made greater than that from one of said spaces.

29. The assembly of claim 28 wherein said first element includes a pair of transparent sheets adhered to one another with an optically transparent material.

30. The assembly of claim 29 wherein said pair of transparent sheets are laminated to one another with a polymer layer.

31. The assembly of claim 29 including a reflective coating on one of said front and rear facing surfaces of one of said second and third elements adapted to reflect light incident thereon through said assembly.

32. The assembly of claim 29 wherein at least one of the surfaces of said first, second and third elements which face one another includes a thin film, said film having an index of refraction below that of said one element to which it is applied, said combined indices of refraction of said one element and said thin film being generally matched to that of said electrochromic material whereby internal light reflection is reduced and overall light transmission is enhanced.

33. The assembly of claim 28 wherein said electrical means include transparent, electrically conductive coatings on the surfaces of said first, second and third elements which face one another and means for connecting an electrical lead to each of said coatings, said electrochromic material being in contact with said conductive coatings in each of said spaces.

34. The assembly of claim 32 wherein said conductive coatings each include a plurality of areas on said second and third elements which are spaced from one another by uncoated deletion lines, said areas on said second element being aligned with respective ones of said areas on said third element, the transmittance of at least one aligned pair of said areas being variable separately from the remainder of said areas for prolonged periods of time with reduced coloration separation.

35. The assembly of claim 33 wherein said second and third elements are offset from said first element such that portions of said conductive coatings are exposed adjacent said peripheral edges of said elements; said means for connecting an electrical lead including a clamp-type, metallic ribbon connector secured to each offset edge of said optical elements, each of said ribbon connectors contacting at least one of said electrically conductive coatings.

36. The assembly of claim 33 wherein at least one of the surfaces of said first, second and third elements which face one another includes a thin film beneath said conductive coating, said film having an index of refraction below that of said one element to which it is applied, said combined indices of refraction of said one element and said thin film being generally matched to that of said electrochromic material whereby internal light reflection is reduced and overall light transmission is enhanced.

37. The assembly of claim 28 including a anti-reflective coating on the outermost surface of at least one of said second and third elements to provide lower total reflectivity and reduced double imaging.

38. The assembly of claim 28 wherein said electrical means is a switching circuit including means for applying electrical power across the electrochromic material in said other of said spaces during the time period in which electrical power is applied across the electrochromic material in said one space, and vice versa during continued, alternating cyclical operation whereby adjustment is made for matching bleaching rates as compared to coloration rates of said electrochromic materials in said spaces.

39. The assembly of claim 28 wherein said electrical means includes means for applying electrical power to the electrochromic material in said other space immediately following application of electrical power to the electrical power in said one space, and vice versa during continued, cyclical operation of said assembly.

40. The assembly of claim 28 wherein said electrical means includes a pair of power terminals, means for connecting one of said power terminals to said first transparent element, switch means for connecting in a first state said one of said power terminals to said second transparent element and the other one of said power terminals to said third transparent element and for connecting in a second state said one of said power terminals to said third transparent, element and said other one of said power terminals to said second transparent element, and means for causing said switch means to switch between said first and second states.

41. The assembly of claim 33 wherein said electrical means further includes an impedance device in electrical series connection between said switch means and said one of said power terminals.

42. The assembly of claim 28 further including means operative upon electrical power failure for shorting said first, second and third transparent elements together.

43. The assembly of claim 28 wherein said assembly includes a reflective coating on one of said front and rear facing surfaces of one of said second and third elements adapted to reflect light incident thereon through said assembly such that said assembly operates as a rearview mirror;

said electrical means including means for applying said electrical power concurrently to both of said spaces for short periods of high glare intensity to reduce the light transmittance and reflectance therethrough, said short periods being insufficient to create coloration segregation in said electrochromic material in said spaces, whereby such high glare intensity is reduced during such periods.

44. An electrochromic assembly comprising:

first and second tandemly mounted electrochromic elements, each of said elements having a layer of electrochromic material, the transmittance of which varies when an electrical field is applied thereacross and a pair of electrically conductive busses adapted to applying an electrical field across said layer;

a power source including first and second power terminals and means for applying electrical power thereacross, said power source being adapted to changing each of said elements from a substantially transparent condition to a colored condition;

means for connecting one of said power terminals to one of said busses of each of said elements;

first switch means for alternatingly connecting the other one of said busses of one of said elements to said first and second power terminals;

second switch means for alternatingly connecting the other one of said busses of the other one of said elements to said first and second power terminals; and control means for causing said first and second switch means to switch between said first and second power terminals whereby one of said elements is colored when said other element is bleached and vice-versa on an alternating basis.

45. The assembly of claim 44 wherein said control means causes said first and second switch means to alternatively switch repetitively between said first and second power terminals whereby said power source may be applied across one of said electrochromic elements while a short circuit is applied across the other one of said electrochromic elements.

46. The assembly of claim 45 wherein said first switch means begins to apply a voltage across said one of said elements concurrently with said second switch means beginning to apply a short circuit across said other one of said elements, and vice versa.

47. The assembly of claim 44 further including an electrical impedance between each of said first and second switch means and said one of said power terminals in order to compensate for a faster rate of bleaching each element to said substantially transparent condition than coloring to said substantially opaque condition.

48. The assembly of claim 44 further including third switch means for selectively disabling said first and second switch means and for shorting said busses in each of said electrochromic elements.

49. The assembly of claim 44 wherein said voltage across said power terminals is variable.

50. The assembly of claim 44 wherein said assembly includes a reflective layer on one of said first and second elements and operates as a rearview mirror;

said control means including means for causing said first and second switch means to concurrently connect said other one of said busses to the other one of said power terminals for short periods of high glare intensity to reduce the light transmittance and reflectance through both of said elements, said short periods being insufficient to create coloration segregation in said electrochromatic material of said elements, whereby such high glare intensity is reduced.

51. The assembly of claim 44 wherein said power source includes means for periodically reversing the polarity of said electrical power applied to said power terminals.

* * * * *

UNITED STATES PATENT AND TRADEMARK OFFICE
CERTIFICATE OF CORRECTION

PATENT NO. : 5,076,673
DATED : December 31, 1991
INVENTOR(S) : Niall R. Lynam and Kenneth L. Schierbeek It is certified that error appears in the above-identified patent and that said Letters Patent is hereby corrected as shown below:

Column 6, line 57:
"7/454,398" should be --07/454,398--.

Column 13, line 24:
"electrochromatic" should be --electrochromic--.

Column 14, line 4:
"Assembly lo" should be --Assembly 10--.

Column 17, line 2:
After "Uvinul" insert --400™--.

Column 19, line 67:
"remotel" should be --remotely--.

Column 24, Claim 34, line 55:
"Claim 32" should be --Claim 33--.

Signed and Sealed this

Seventeenth Day of August, 1993

Attest:

BRUCE LEHMAN

Attesting Officer

Commissioner of Patents and Trademarks